July 4, 1939.  B. A. DICKERSON  2,164,389
COMBINED SOCKET COVER AND FLEXIBLE JOINT
Filed June 10, 1938  2 Sheets-Sheet 1

Inventor
Bert A. Dickerson
Harry Lea Dodson
Attorney

July 4, 1939.  B. A. DICKERSON  2,164,389
COMBINED SOCKET COVER AND FLEXIBLE JOINT
Filed June 10, 1938  2 Sheets-Sheet 2
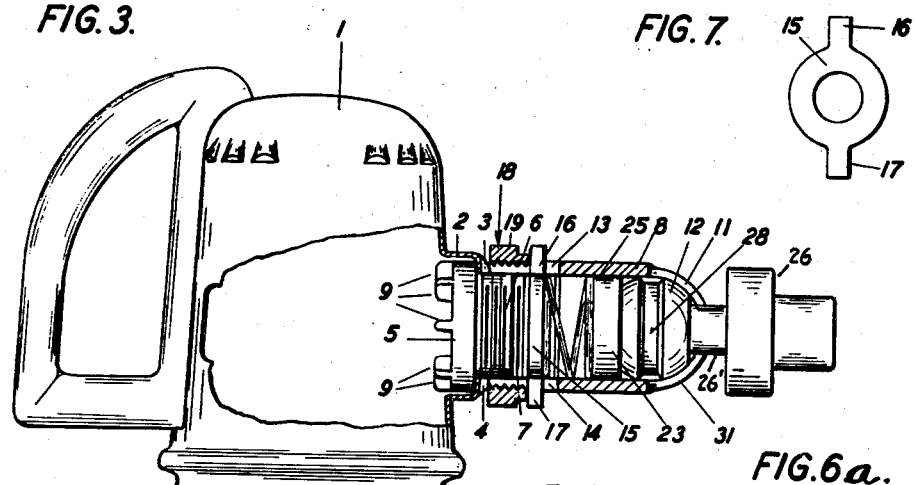
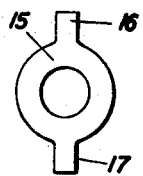
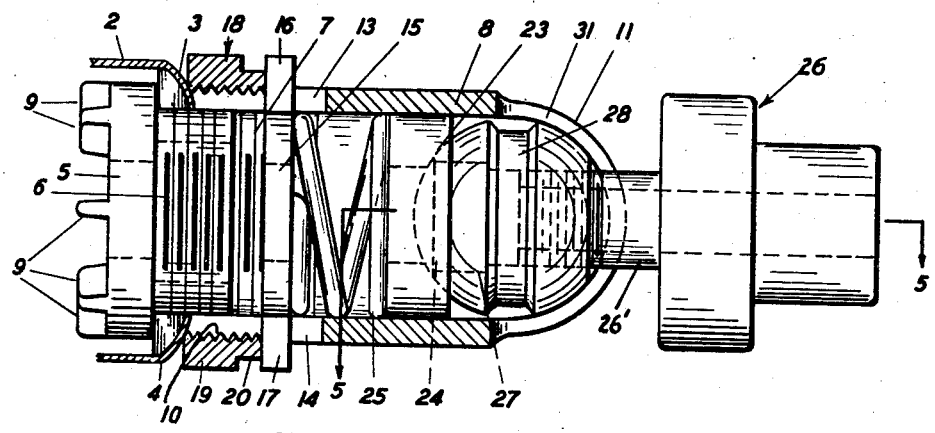
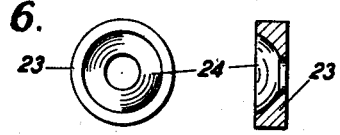
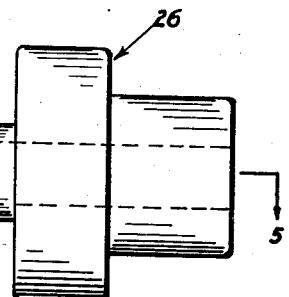
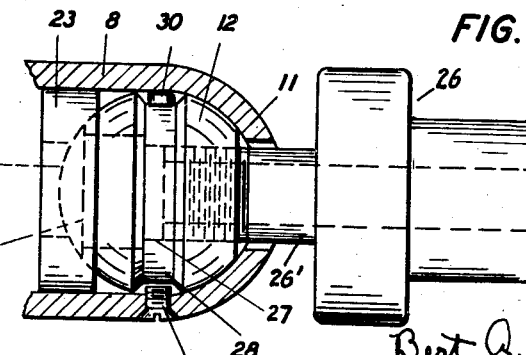
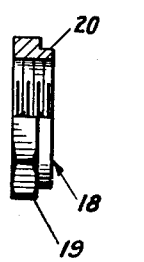
Inventor
Bert A. Dickerson
Harry Lea Dodson
Attorney Patented July 4, 1939

2,164,389

UNITED STATES PATENT OFFICE 2,164,389

COMBINED SOCKET COVER AND FLEXIBLE JOINT

Bert A. Dickerson, Decatur, Ill., assignor to Faries Manufacturing Company, Decatur, Ill., a corporation of Illinois Application June 10, 1938, Serial No. 212,908

7 Claims. (Cl. 287—12)

My invention relates primarily to that class of devices such as are described in United States Letters Patent No. 1,854,302, although it will be apparent from the hereinafter contained description that it can be used in many other places.

It has been found in practice that it is difficult to secure the socket cover to the flexible joint and at the same time to provide for the regulation of the tension between the ball and socket which form the flexible joint in order to compensate for the wear from usage so as to hold the attached light in the required position at all times and under all circumstances.

My invention has for its principal object to provide a combined socket cover and flexible joint, in which the tension adjusting member is used to co-act to hold the socket cover in place.

A further object is to provide improved means to regulate and adjust the frictional engagement between the ball and socket which constitute the joint.

A further object is to provide for the extension of said adjustment, means whereby a varied selection of fittings can be used on the male or the female threaded portion of the housing, said fittings being readily interchangeable and removable without interfering with or changing the position or compression of the spring.

A further object is to provide a joint which can be used for various other purposes besides with a socket cover.

A further object is to maintain the ball joint under constant pressure at one end of the sleeve by means entirely separate from a cap fitting or retaining collar of any kind.

Other objects will appear from the following description:

My means of accomplishing the foregoing objects may be more fully comprehended by having reference to the accompanying drawings, which are hereunto annexed and are a part of this specification in which:

Fig. 3 is a side elevation of my improved socket cover and flexible joint with parts broken away and in section for clarity;

Fig. 4 is an enlarged fragmentary detail view of the joint, a portion of the outer covering being broken away showing some parts in section;

Fig. 5 is an enlarged fragmentary detail view on line 5—5, Fig. 4, showing the means to prevent the twisting off of wires;

Figs. 6 and 6A are detail views of the tension adjusting washer;

Fig. 7 is a detail view of the spring adjusting washer;

Fig. 8 is a detail view of the tension adjusting nut.

Similar reference numerals refer to similar parts throughout the entire specification.

Figure 1:
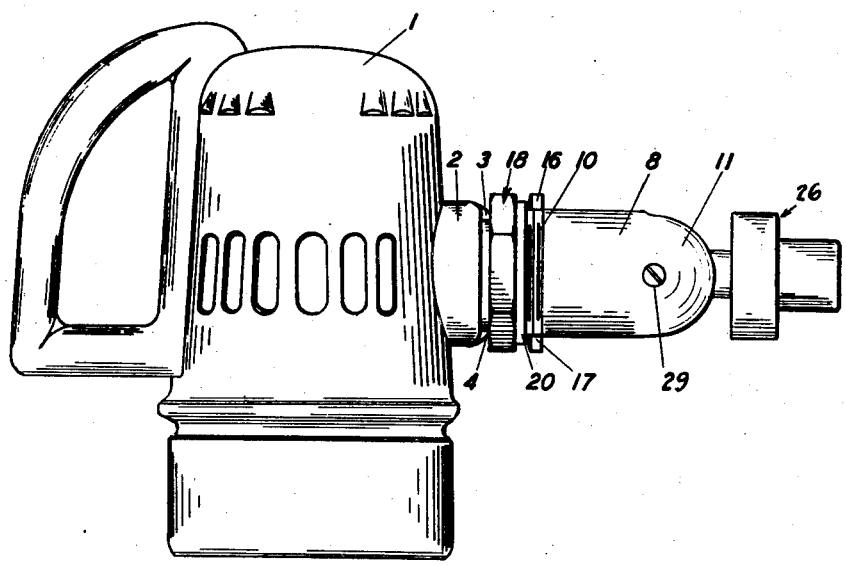
Fig. 1 is a side elevation of my improved socket cover and flexible joint.

As shown in the drawings, the socket cover, which obviously may be of any desired shape is provided with a laterally extending lug 2, on the face of which at diametrically opposite points I form two bosses, 3 and 4 respectively.

Figure 2:
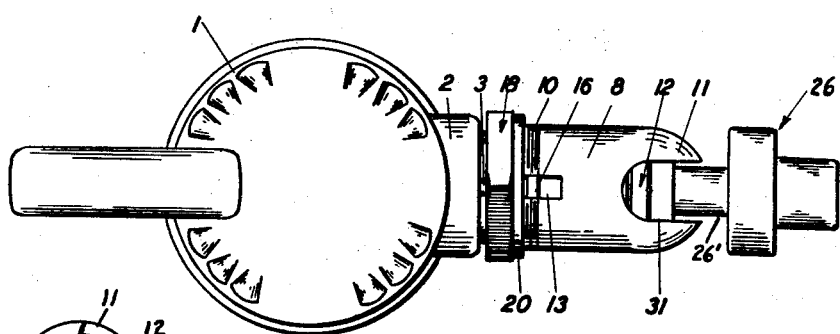
Fig. 2 is a top plan view of Fig. 1.
Figure 9:
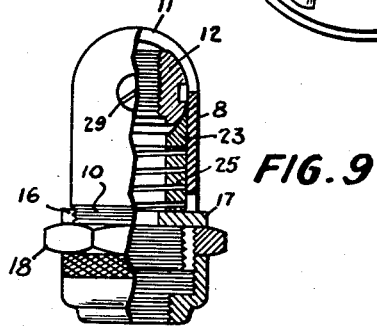
Fig. 9 is a side elevation partly in section of the flexible joint per se provided with a different supporting means.

In the lug 2 I mount a bushing 5 which is provided with external threads 6, which are fitted to internal threads 7, formed in one end of a sleeve 8. I have found it convenient to provide a plurality of protuberances 9 on the face of the bushing 5 to enable its easy rotation for the purpose of screwing it into the sleeve 8. The flexible joint comprises a sleeve 8 which is provided with external threads 10 outside of the threads 7. The other end of the sleeve 8 is closed to form a socket 11 adapted to receive a ball 12. The outer wall of the socket 11 is slotted as clearly seen in Fig. 2 and the detail view Figs. 3 and 4 and 5 to permit the arm (not shown) to swing through a vertical arc. Slots 13 and 14 are cut or formed in the threaded end of the sleeve 8. These slots 13 and 14 are in register with the bosses 3 and 4 so that when the bushing is tightened it will draw the sleeve against the face of the lug 2 and the bosses 3 and 4 will enter the slots 13 and 14 and the sleeve 8 will be held against rotation.

A flat washer 15 which has radial projections 16 and 17 is mounted in the threaded end of the sleeve 8. These lugs are fitted to and slidable in the slots 13 and 14 in the sleeve 8.

A nut 18 is mounted on the threads 10. This nut is formed with a hexagonal portion 19 for convenient manipulation by a wrench, or it may if desired, be round and have its surface knurled. A cylindrical portion 20 preferably extends from one side of the nut 18 and engages the projections 16 and 17 of the flat washer 15, which project through the slots 13 and 14, for that purpose.

Inside of the sleeve and abutting the ball 12 I mount a washer 23. This washer has a concave recess 24 which fits the surface of the ball 12. A coil spring 25 is placed intermediate the flat washer 15 and the concave washer 23. This spring exerts a tension on the washer 23 and in turn on the ball 12 thus increasing the friction between it and the socket 11. Obviously by screwing the nut 18 on the threads 10 the flat washer 15 will be caused to compress the coil spring 25 and thus increase its tension and consequently the friction of the ball 12 on the socket 11. Movement of the nut 18 in the opposite direction will correspondingly decrease the tension of said spring, thus permitting an extremely nice adjustment of these parts. Thus it will be seen that the ball is not held in place merely by a depressed collar in the sleeve 8 nor by a cap thereon but I have provided means which hold the spring 25 continuously under any predetermined pressure, and that this tension can be at any predetermined pressure suitable for the use to which the joint is to be put.

The ball 12 has a central passage 27 through its center. This passage is provided with internal threads which fit threads cut upon one end of a hub or nipple 26' which projects outwardly from a disc 26.

A hole is drilled through this hub or nipple and registers with the passage or hole 27 in the ball 12 thus providing for the passage of electric wires. Holes are also provided in the washers 15 and 23 for the same purpose.

It may be found desirable to provide a circumferential groove 28 in the surface of the ball 12, into which extends a screw 29 mounted in the sleeve 8. A stop 30 is placed in the groove to prevent the device being turned entirely around and so twisting off the electric wires.

The walls of the socket 11 are slotted as at 31 to permit the vertical movement of the hub or nipple 26'. The device is assembled as follows: The ball 12 is dropped in the sleeve 8 with the groove 28 in register with the inner end of the screw 29. The ball 12 can then be rotated until the axis of the central passage is coincident with the axis of the cylindrical sleeve 8 when the threaded hub 26' of the disc 26 can be screwed into the internal threads in the ball 12. The washer 23 is then dropped into the sleeve with the concave recess facing the ball 12. The coil spring 25 is then inserted. Next the flat washer 15 is placed in position, its projections 16 and 17 sliding in the slots 14 and 15. The nut 18 is then screwed onto the threads 10 and the flexible joint is assembled. In order to attach the socket cover 1 to the joint the bushing 5 is inserted in the lug 2 and the threads 6 are screwed into the internal threads 7 on the sleeve 8, this draws the sleeve 8 against the face of the lug 2 and presses the bosses 3 and 4 into the slots 13 and 14 and the sleeve 8 is securely attached to the socket cover although it can be quickly and easily detached if desired.

Having described my invention, what I regard as new and desire to secure by Letters Patent is:

1. A combined socket cover and adjustable joint comprising a socket cover, a laterally extending lug thereon, bosses on the face of said lug at diametrically opposite points, a threaded bushing mounted in said lug, a sleeve mounted on said bushing, having slots in register with said bosses, a nut mounted on external threads on one end of said sleeve, a socket at the other end of said sleeve, a ball in said socket, a washer in said sleeve having a concave recess therein which fits said ball, a flat washer having diametrically opposite radially extending projections thereon which fit the slots in the threaded end of said sleeve and in which said projections slide, and a coil spring in said sleeve intermediate said washers, said nut abutting the projections on said washer, whereby the movement of said nut varies the tension of said spring.

2. A combined socket cover and adjustable joint comprising a socket cover, a laterally extending lug thereon, bosses on the face of said lug at diametrically opposite points, a threaded bushing mounted in said lug, a sleeve mounted on said bushing, having slots in register with said bosses, a nut mounted on external threads on one end of said sleeve, a socket in the other end of said sleeve, a ball in said socket, and means actuated by the movement of said nut to vary the frictional engagement of said ball and socket.

3. A combined socket cover and adjustable joint comprising a socket cover, a laterally extending lug thereon, bosses on the face of said lug at diametrically opposite points, a threaded bushing mounted in said lug, a sleeve mounted on said bushing, having slots which register with said bosses, a nut mounted on external threads on one end of said sleeve, a socket at the other end of said sleeve, a ball in said socket, there being a passage through the center of said ball having threads cut therein, a disc having laterally extending hubs formed thereon one of which is threaded to fit the internal threads in the ball, there being a slot in said socket to permit vertical movement of said last mentioned hub, and means actuated by said nut to vary the frictional engagement of said ball and socket.

4. A combined socket cover and adjustable joint comprising a socket cover, a laterally extending lug thereon, bosses on the face of said lug at diametrically opposite points, a threaded bushing mounted in said lug, a sleeve mounted on said bushing, having slots in register with said bosses, a nut mounted on external threads on one end of said sleeve, a socket at the other end of said sleeve, a ball in said socket, means actuated by the movement of said nut to vary the frictional engagement of said ball and socket, and means to prevent the complete rotation of said sleeve on said ball.

5. A combined socket cover and adjustable joint comprising a socket cover, a laterally extending lug thereon, bosses on the face of said lug at diametrically opposite points, a threaded bushing mounted in said lug, a sleeve mounted on said bushing, having slots in register with said bosses, a nut mounted on external threads on one end of said sleeve, a socket at the other end of said sleeve, a ball in said socket, there being a passage through the center of said ball having internal threads cut therein, a disc having laterally extending hubs formed thereon one of which is threaded to fit the internal threads in the ball, there being a slot in said socket to permit vertical movement of said last mentioned hub, means actuated by said nut to vary the frictional engagement of said ball and socket, and means to prevent the complete rotation of said sleeve on said ball.

6. A combined socket cover and adjustable joint comprising a socket cover, a laterally extending lug thereon, bosses on the face of said lug at diametrically opposite points, a threaded bushing mounted in said lug, a sleeve mounted on said bushing, having slots in register with said bosses, a nut mounted on external threads on one end of said sleeve, a socket at the other end of said sleeve, a ball in said socket, a washer in said sleeve having a concave recess therein which fits said ball, a flat washer having diametrically opposite radially extending projections thereon, which fit the slots in the threaded end of said sleeve and in which said projections slide, a coil spring in said sleeve intermediate said washers, said nut abutting the projections on said washer, whereby the movement of said nut varies the tension of said spring and means to prevent the complete rotation of said sleeve on said ball.

7. An adjustable joint comprising, a cylindrical sleeve having a rounded closed end, there being a slot in said rounded end, external threads on the other end of said sleeve, said threaded end being provided with slots with open ends, a socket in the rounded end of said sleeve, a ball in said socket, a washer in said sleeve having a concave recess therein which fits said ball, a flat washer having radially extending projections which fit the slots in the threaded end of said sleeve and in which said projections slide, a nut mounted on the threads on said sleeve, said nut abutting the projections on the flat washer, a coil spring in said sleeve intermediate said washers, and an annular cap on the threaded end of said sleeve.

BERT A. DICKERSON.